(12) United States Patent
Shang et al.

(10) Patent No.: US 11,573,889 B2
(45) Date of Patent: Feb. 7, 2023

(54) USING GRAPHICAL IMAGE ANALYSIS FOR IDENTIFYING IMAGE OBJECTS

(71) Applicant: MICRO FOCUS LLC, Santa Clara, CA (US)

(72) Inventors: Er-Xin Shang, Shanghai (CN); Hua-Ming Zhai, Shanghai (CN); Yun-Sheng Liu, Shanghai (CN); Tezeen Yu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/093,741

(22) Filed: Nov. 10, 2020

(65) Prior Publication Data

US 2022/0147439 A1    May 12, 2022

(51) Int. Cl.
*G06F 11/36*       (2006.01)
*G06N 20/00*      (2019.01)
*G06V 20/62*       (2022.01)

(52) U.S. Cl.
CPC ........ *G06F 11/3696* (2013.01); *G06F 11/368* (2013.01); *G06F 11/3688* (2013.01); *G06N 20/00* (2019.01); *G06V 20/62* (2022.01)

(58) Field of Classification Search
CPC ......... G06K 9/4604; G06F 11/36; G06F 8/65; G06F 9/451
See application file for complete search history.

(56) References Cited

U.S. PATENT DOCUMENTS

| | | | |
|---|---|---|---|
| 9,424,167 B2 | 8/2016 | Lee et al. | |
| 9,846,634 B2 | 12/2017 | Ji et al. | |
| 9,946,637 B2 | 4/2018 | Zhang et al. | |
| 10,620,975 B1* | 4/2020 | Zohar | G06F 3/0482 |
| 2011/0214107 A1 | 9/2011 | Barmeir et al. | |
| 2014/0033091 A1* | 1/2014 | Schein | G06F 9/451 |
| | | | 715/764 |
| 2015/0339213 A1* | 11/2015 | Lee | G06F 3/0484 |
| | | | 717/125 |
| 2015/0378876 A1* | 12/2015 | Ji | G06F 11/3688 |
| | | | 714/38.1 |

(Continued)

OTHER PUBLICATIONS

Russ Thomas; Web Test Object; https://forum.katalon.com/discussion/6171/creation-of-test-object-in-object-repository-in-runtime#Comment_13991); Mar. 24 (year unknown); 13 pages.

(Continued)

*Primary Examiner* — Ziaul A Chowdhury
(74) *Attorney, Agent, or Firm* — Sheridan Ross P.C.

(57) ABSTRACT

An image of a graphical user interface is captured. For example, a screen shot of a browser display is captured. Text syntax is executed that contains one or more parameters for identifying a graphical object. For example, the text syntax may identify a rectangle that contains the text "OK" where the text is red. Based on the text syntax, a graphical object is identified in the image of the graphical user interface. Information is returned that identifies how to access the graphical object in the graphical user interface. For example, coordinates of the graphical object are identified. This information can then be used in a test script using existing programming languages to test the graphical user interface. For example, the coordinates may be used to click on the OK button.

20 Claims, 4 Drawing Sheets

(56) References Cited

U.S. PATENT DOCUMENTS

2017/0371652 A1* 12/2017 Hsu .................... G06F 3/0484
2018/0039559 A1   2/2018 Gillaspie
2020/0174911 A1   6/2020 Ben Shabtai et al.

OTHER PUBLICATIONS

Tom Yeh, et al; Sikuli: Using GUI Screenshots for Search and Automation.; In Proceedings of the 22nd annual ACM symposium on User interface software and technology (UIST '09). ACM, New York, NY, USA, 183-192; 2009; 11 pages.

Author Unknown "Finding and Interacting with Image Elements," GitHub, Retrieved Online Aug. 24, 2020, 4 pages [retrieved online from: github.com/appium/appium/edit/master/docs/en/advanced-concepts/image-elements.md].

* cited by examiner

USING GRAPHICAL IMAGE ANALYSIS FOR IDENTIFYING IMAGE OBJECTS

FIELD

The disclosure relates generally to software testing and particularly to software testing using image analysis.

BACKGROUND

Traditional software programming methods typically use information from the code base of an application for developing test software. For example, a developer of a test script may use a Document Object Model DOM of a web page to develop a set of test scripts to test the application. One problem with this approach is that the developer of the test script may not actually have access to the source code of the application under test. For example, the application under test is still being developed or the application under test is being tested by a third party.

An alternative is to use captured images of a user graphical user interface of the application under test (e.g., a screen shot of a browser) in order to identify graphical objects in the graphical user interface. However, when it comes to image comparison, the challenge is quite different. For example, in order to do image comparison, current systems use image comparison algorithms to match one image with another. While image comparison can be very useful in identifying graphical objects in a graphical user interface, there are still limitations in the current image comparison algorithms. There are times when the image comparison algorithm cannot completely parse and understand a target graphical object. For example, in most cases, the target graphical object contains unnecessary information such as additional image edges, unimportant colors, shapes etc. This type information can reduce the accuracy of identifying a graphical object in a user interface. What is needed is a simplified way of identifying specific graphical objects in the graphical user interface.

SUMMARY

These and other needs are addressed by the various embodiments and configurations of the present disclosure. An image of a graphical user interface is captured. For example, a screen shot of a browser display is captured. Text syntax is executed that contains one or more parameters for identifying a graphical object. For example, the text syntax may identify a rectangle that contains the text "OK" where the text is red. Based on the text syntax, a graphical object is identified in the image of the graphical user interface. Information is returned that identifies how to access the graphical object in the graphical user interface. For example, coordinates of the graphical object are identified. This information can then be used in a test script using existing programming languages to test the graphical user interface. For example, the coordinates may be used to click on the OK button.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "execute" as described herein and in the claims refers to the execution/interpretation of text syntax. For example, the text syntax may be executed during runtime by an interpreter. The text syntax may be compiled into a binary executable and executed during runtime.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
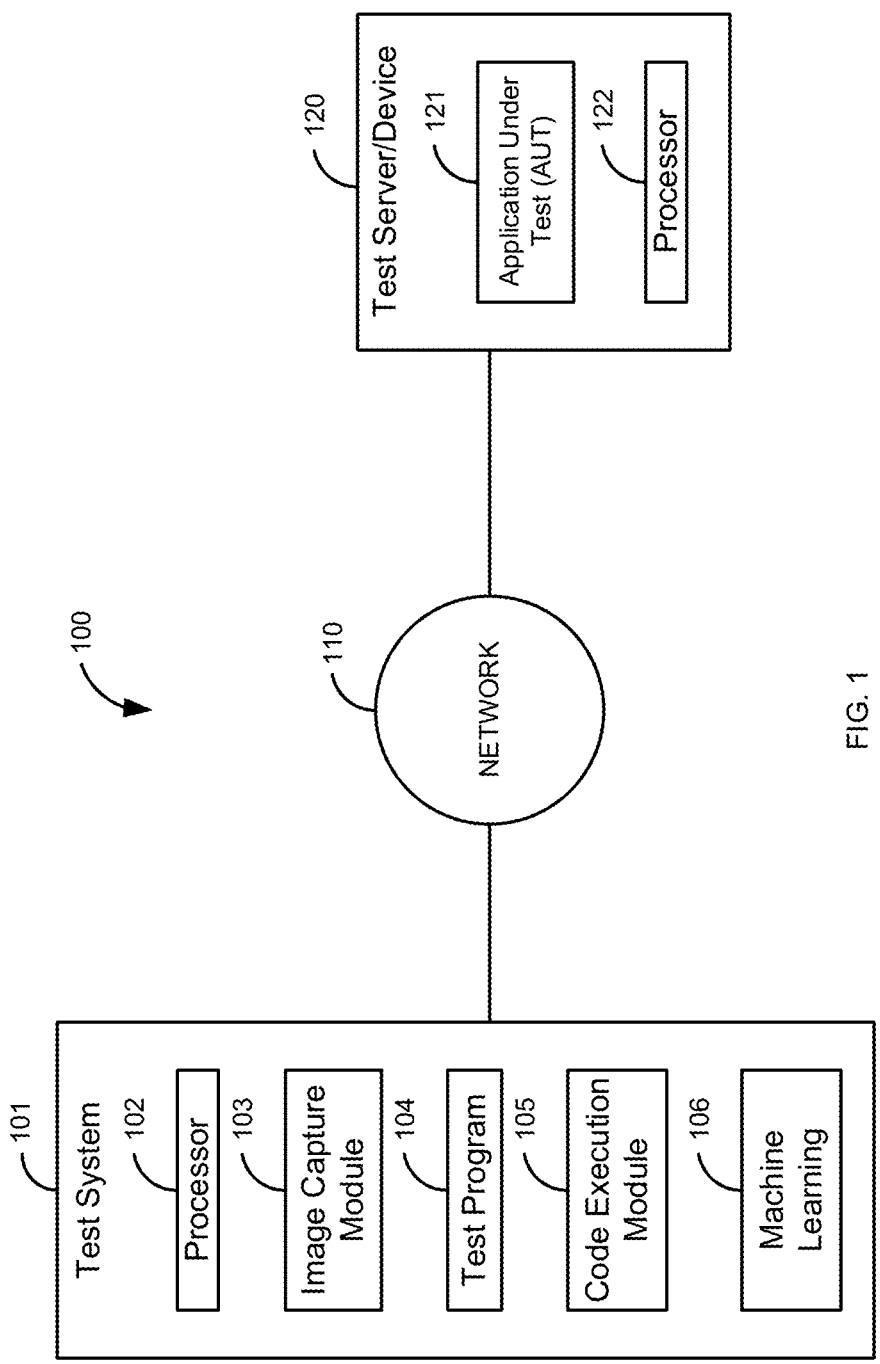
FIG. 1 is a block diagram of a first illustrative system for identifying graphical object(s) in an image of a graphical user interface.

FIG. 1 is a block diagram of a first illustrative system 100 for identifying graphical object(s) in an image of a graphical user interface. The first illustrative system 100 comprises a test system 101, a network 110, and test server/device 120.

The test system 101 comprises a processor 102, an image capture module 103, a test program 104, a code execution module 105 and machine learning 106. The test system 101 can be or may include any device used for testing the test server/device 120, such as, a Personal Computer (PC), a telephone, a video system, a cellular telephone, a Personal Digital Assistant (PDA), a tablet device, a notebook device, a smartphone, a server, and/or the like. Although not shown in FIG. 1, the test system 101 may comprise multiple test systems 101. For example, the test system 101 may comprise a plurality of tests systems 101 that test the test server/device 120 in parallel and/or in series.

The processor 102 can be, or may include, any kind of processor that can process computer code, such as, a hardware processor, a microprocessor, a micro controller, a multi-core processor, an application specific processor, a virtual machine, and/or the like.

The image capture module 103 can be, or may include, any software/hardware that can capture and process an image. The image capture module 103 may capture an image using a camera or may directly capture the image that is generated by the test system 101. For example, the image capture module 103 may capture an image that is generated directly from a headless browser.

The test program 104 can be, or may include, any software/hardware that can generate test(s) for testing the application under test 121. The test program 104 can be written in various programming languages, such as, C, C++, Java, JavaScript, Hyper Text Markup Language (HTML), PERL, and/or the like. The test program 104 may include any of the test scripts/Application Programming Languages (APIs)/text syntax described herein in conjunction with any known programming languages.

The code execution module 105 can be, or may include, any hardware/software that can be used to execute the test program 104. The code execution module 105 may run any developed test scripts/test programs 104 using the text syntax/APIs described herein. The code execution module 105 may be a code interpreter, may execute code that has been compiled into binary code, and/or the like.

The machine learning 106 can be or may include any software/hardware process that can learn based on an input, such as, supervised machine learning, unsupervised machine learning, reinforcement machine learning, and/or the like. The machine learning 106 can be used to learn how to identify graphical objects in a graphical user interface as described below in FIG. 2.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Integrated Services Digital Network (ISDN), Hyper Text Markup Language (HTML), Web Real-Time Transport (Web RTC) protocol, and/or the like. Thus, the network 110 is an electronic communication network configured to carry messages via packets and/or circuit switched communications.

The test server/device 120 can be or may include any server/device that can support an application under test 121. For example, the test server/device 120 may be a file server, a web server, an application server, a computer, an embedded device, or any device that generates a graphical user interface that can be tested. The test server/device 120 further comprises the application under test 121 and a processor 122.

The application under test 121 can be or may include any application that has a graphical user interface that can be tested. The application under test 121 is tested by the test program 104 using the processes described herein in conjunction with known testing techniques.

The processor 122 can be similar to the processor 102. For example, the processor 122 may be a microprocessor.

In one embodiment, the test system 101 may be part of the test server 120. In this embodiment, the network 110 may not be used and the test system is executed on the test server/device 120.

Figure 2:
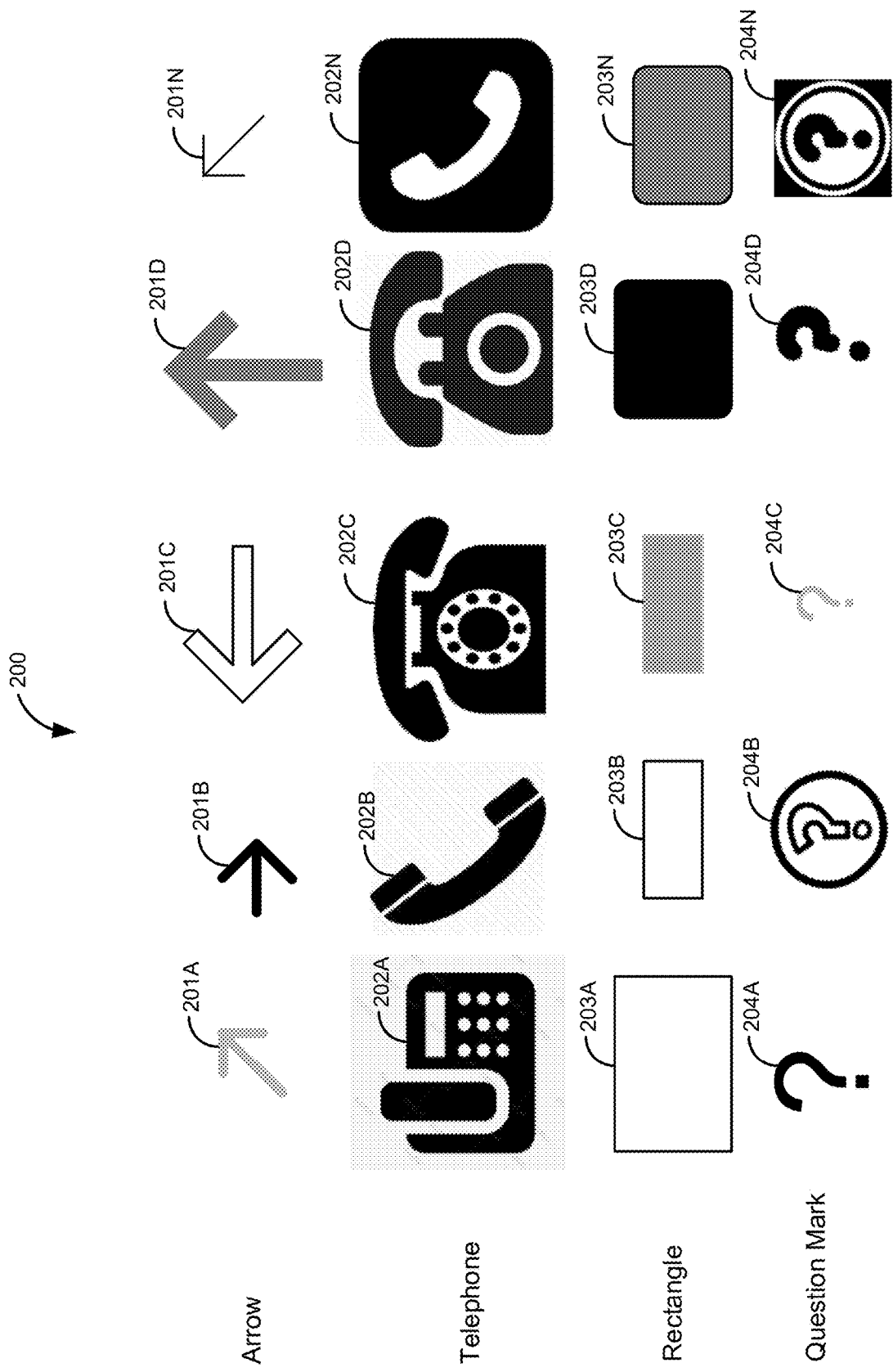
FIG. 2 is a diagram of images that are used to train a machine learning algorithm for identifying graphical object(s) in an image of a graphical user interface.
Figure 3:
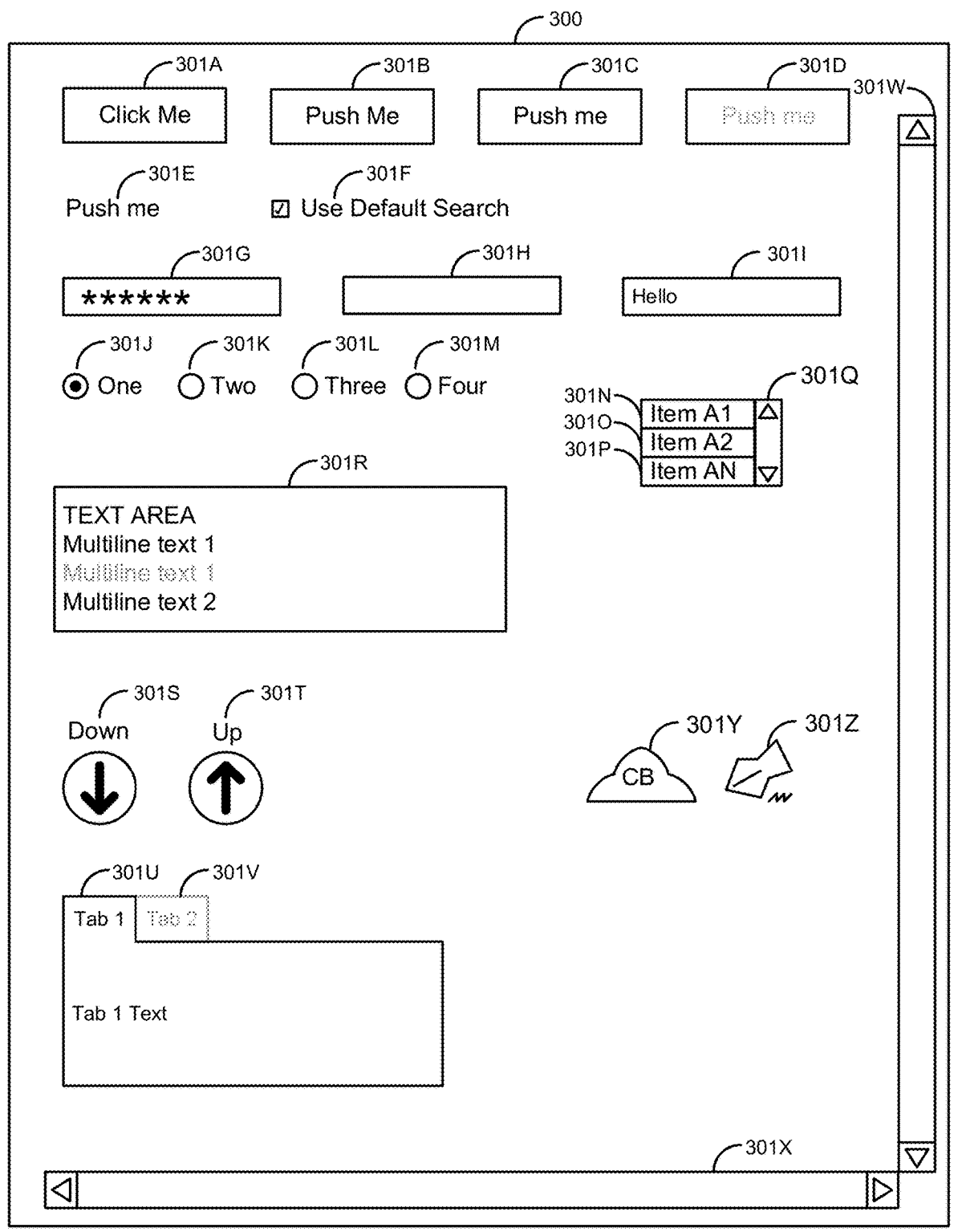
FIG. 3 is a diagram of an exemplary captured image of a graphical user interface.
Figure 4:
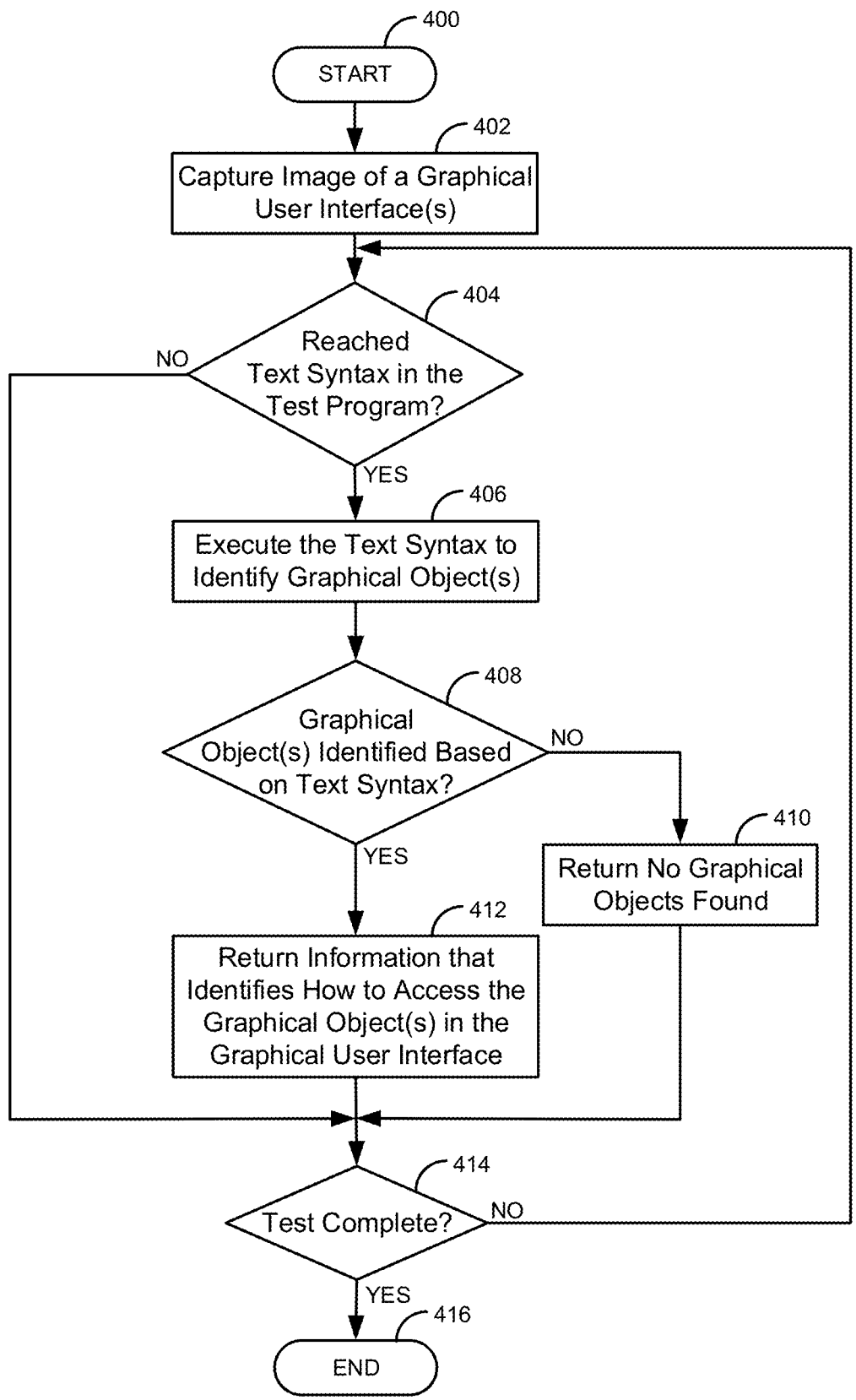
FIG. 4 is a flow diagram of a process for identifying graphical object(s) in an image of a graphical user interface.

FIG. 2 is a diagram of images 200 that are used to train a machine learning algorithm for identifying graphical object(s) in an image of a graphical user interface (e.g. graphical user interface 300). Illustratively, the test system 101, the image capture module 103, the test program 104, the code execution module 105, the test server/device 120, and the application under test 121 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The diagram of images 200 comprises arrow images 201A-201N, telephone images 202A-202N, rectangle images 203A-203N, and question mark images 204A-204N. The images 201-204 are used as input into the machine learning 106 so that the machine learning 106 can better identify specific types of graphical objects in the graphical user interface.

For example, the machine learning 106 takes in the different arrow images 201A-201N so that the machine learning 106 can better identify different types of arrows. The arrow images 201A-201N can be different in size, orientation, shading, thickness, and/or the like. As indicated by arrow image 201N, there can be any number of arrow images 201 that can be used as input to train the machine learning 106. Although not shown, the arrow images 201A-201N be in different colors or shades of colors. The machine learning 106, based on the arrow images 201A-201N can now better identify new arrow images 201 in the graphical user interface.

Likewise, the different telephone images 202A-202N can be provided as an input to the machine learning 106 so that the machine learning 106 can be trained to better identify images of telephones in the graphical user interface. Although shown as black and white images, the telephone images may be in different colors and/or shades. Likewise, as indicated by telephone image 201N, there can be any number of telephone images 202 that can be used as input to train the machine learning 106.

The different rectangle images 203A-203N can be provided as an input to the machine learning 106 so that the machine learning 106 can be trained to better identify images of rectangles in the graphical user interface. For example, the machine learning 106 may now be able to identify a rectangle that is embedded within a particular graphical object. Although shown as black, white, and grey images, the rectangle images 203A-203N may be in different colors. Likewise, as indicated by rectangle image 203N, there can be any number of rectangle images 203 that can be used as input to train the machine learning 106.

Likewise, the different question mark images 204A-204N can be provided as an input to the machine learning 106 so that the machine learning 106 can be trained to better identify images of question marks in the graphical user interface. Although shown as black, white, and grey images, the question mark images 204A-204N may be in different colors. Likewise, as indicated by question mark image 204N, there can be any number of question mark images 204 that can be used as input to train the machine learning 106.

FIG. 2 shows four different types of images 201-204 that can be used to train the machine learning 106. As one of skill in the art would understand, the machine learning 106 can be trained to identify any number of graphical objects by using one or more images for identifying a particular type of graphical object. For example, the machine learning 106 can be trained to identify any known graphical object, such as, buttons, radio buttons, text boxes, text areas, check boxes, menus, menu items, lists, icons, images, tab fields, scrollbars, circles, ovals, triangles, hexagons, boxes, star shapes, and/or the like based on being trained using similar graphical objects.

Once the machine learning 106 has completed the training, the machine learning 106 can now be applied to a captured image of the graphical user interface. The machine learning 106 is then tied to various kinds of text syntax that allows a developer to test the application under test 121. The text syntax is a form of an Application Programming Interface (API) that the developer can incorporate into existing programs (e.g., a JavaScript program for testing the application under test 121.

FIG. 3 is a diagram of an exemplary captured image of a graphical user interface 300. The captured graphical user interface 300 comprises the graphical objects 301A-301Z. While FIG. 3 shows various graphical objects 301A-301Z, one of skill in the art would recognize that other types of graphical objects 301 may be captured in the image of the graphical user interface 300. The captured image of the graphical user interface 300 may also comprise a series of captured images of the application under test 121. For example, the series of captured images may be images of multiple web pages of the application under test 121.

Graphical objects 301A-301D are button objects. Graphical object 301A contains the text "Click Me" that is black in color. Graphical object 301B contains the text "Push Me" that is black in color. Graphical object 301C contains the text "Push me" that is black in color. Graphical object 301D contains the text "Push me" that is grey in color. Note that in the graphical objects 301C-301E the m in "me" is lower case where in graphical object 301B the M in "Me" is in upper case.

Graphical object 301E is a text object that contains the text "Push me" in the color black. Graphical object 301F is a check box object that has been checked and has an associated text of "Use Default Search" in the color black.

Graphical objects 301G-301I are text field objects. Graphical object 301G is a password field that contains the text "****" in the color black. Graphical object 301H is a text field that has no text. Graphical object 301I** is a text field that contains the word "Hello" in the color black.

Graphical objects 301J-301M comprise is a radio button object. The radio button object is a compound object that comprise four selectable radio button objects. The four selectable radio buttons (301J-301M) are labeled "One", "Two", "Three", and "Four" respectively. The labels for the radio buttons 301J-301M are black in color.

The graphical objects 301N-301Q comprise a compound list object. The graphical objects 301N-301P are individual list objects that are labeled "Item A1", "Item A2", and "Item AN" respectively. The list objects 301N-301P are in the color black. The graphical object 301Q is a scrollbar object that allows a user to scroll the list objects 301N-301Q.

The graphical object 301R is a text area object. The text area object 301R contains four lines of text: 1) "TEXT AREA", 2) "Multiline text 1", 3) "Multiline text 1", and 4) "Multiline text 2". The text objects "TEXT AREA" and "Multiline text 2" are black in color. There are two text lines with the text "Multiline text 1" in the object 301R where one is in the color grey and one is in the color black.

The graphical objects 301S-301T are circular button objects. The graphical object 301S is a circular button object that allows a user to scroll down in a window. The graphical object 301S contains a down arrow object. The graphical object 301S has an associated text that says "Down" and is the color black. The graphical object 301T is a circular button object that allows the user to scroll up in a window. The graphical object 301T contains an up arrow object. The graphical object 301T has an associated text that says "Up" and is the color black.

The graphical objects 301U-301V are tab pane objects. The graphical object 301U is a first tab pane object that is labeled "Tab 1" and contains the text "Tab 1 Text". The graphical object 301V is a second tab pane object that is labeled "Tab 2". Only the tab of the second tab pane object 301V is shown because the rest of the second tab pane object 301V is hidden. The color of the tab and the text of the graphical object 301U is black. The color of the tab pane object 301V is grey.

The graphical objects 301W-301X are scrollbar objects. The graphical object 301W is a vertical scrollbar object and the graphical object 301X is a horizontal scrollbar object. The graphical objects 301W-301X are compound objects that consist of a rectangle object and two square objects. The two square objects each contain a triangle object (a scrollbar pointer). The triangle objects point in the direction of scrolling for the scrollbar pointer.

The graphical objects 301Y-301Z are icon objects. The graphical object 301Y is for a cloud icon object. The graphical object 301Z is a pen icon object. The graphical objects 301Y-301Z may be button objects that cause an event to occur when selected.

In order to identify the graphical objects 301 a defined text syntax (an Application Programming Interface (API)) is used that has some similarities to existing programming languages (e.g., Cascading Style Sheets), but has been adopted specifically for identifying the graphical objects (e.g., graphical objects 301A-301Z). While the format may have some similarities, the application of the text syntax is being applied in a new and novel format. An exemplary embodiment of the text syntax is show below:

(shape[attribute0 = "value", attribute1 = "value"]
> (shape ~: descriptor shape) ~: up shape )[index]

The term "shape" refers to the type of shape. For example, the shape could be a rectangle, a circle, a triangle, a square, text, etc. The shape may also be a machine learned shape, such as, a telephone, a question mark, an arrow, a button, a menu, a menu item, a scrollbar, and/or the like. The attribute (e.g., attribute 0) is an attribute associated with the shape. For example, the shape may be a rectangle and the attribute may be a color of the shape.

The API set may use relational operators to further identify objects. Relational operations can be used to further refine which graphical object 301 is being searched for. An illustrative example of the relational operators is shown below. As one of skill in the art would understand, different symbols may be used for the relational operators. In addition, other relational operators may be envisioned depending upon the type of graphical object 301 being searched for.
>contains operator
!>does not contain operator
~around operator
!~not around operator
? unknown object operator
& overlap object operator
!& not overlap operator The index is used to identify a specific graphical object 301 out of a group of graphical objects 301 that have been identified using the text syntax. For example, if two graphical objects 301 are identified, the index can be used to further refine the search parameters to identify one of the two graphical objects 301.

To illustrate, consider the text syntax "text("Click Me")". In FIG. 3, this text syntax identifies the graphical object 301A, which is a button that that contains the text "Click Me". In this example, the graphical element 301A is the only graphical object 301 that has the text "Click Me". However, if the text syntax "text("Push me")" is used, graphical objects 301C-301E (two button objects and a text object) are identified. If the user wanted to get information about an individual graphical object 301 of the graphical objects 301C-301E, the syntax "text("Push me") [0]" would return the text element 301C. The index for identifying a specific graphical object 301 can be based on top to bottom using a left to right flow if at the same level or any process where individual graphical objects 301 can be identified. In this example, graphical object 301B would not be identified because the "M" in graphical object 301B is capitalized. If graphical object 301B was to be identified, the text syntax "text("Push Me")" may be used.

Individual graphical objects 301 can be identified in other ways. For example, using the contains relational operator (>), the graphical object 301B can be identified as follows: "rect>text ("Click Me")". The text syntax is looking for a rectangle that contains the text "Click Me", which resolves only to the graphical object 301B. The text syntax "rect>text ("Push me")" identifies graphical objects 301C and 301D because the graphical objects 301C and 301D are both rectangles that contain the text "Push Me". In FIG. 3, the text of graphical object 301C is black and the text of graphical object 301D is grey. To identify a specific graphical object 301C-301D, further refinement is needed using the index field. This can be accomplished by using the following text syntax: "rect>text("Push Me") [color="black"]". In this example, only graphical object 301C is identified. If the text "Push Me" in the graphical object 301C was the color blue instead of black, then the text syntax would be "rect>text ("Push Me") [color="blue"]".

If the user wanted to get information for all rectangles that contain the text "push me" regardless of capitalization, the expression "rect>text("push me") [cap="ignore"]" would be used. In this example, information associated with graphical objects 301B-301D would be returned. Likewise, if a button was a machine learned object, the syntax "button>text ("Push Me") [color=grey]" would return information associated with graphical object 301D. If the user wanted to get all button objects that don't contain the text "Push Me" the text syntax "button!>text("Push Me")" would return information associated with graphical objects 301A and 301C-301D.

To identify the graphical object 301F (the check box) the text syntax "square>icon ("Check")" would identify the checkbox 301F because there is only one checked checkbox in FIG. 3. If the user wanted to identify a checkbox that is not checked, the text syntax "square>icon ("empty")" would identify any checkboxes that are not checked. In FIG. 3, this would return null because there are no checkbox objects that are not checked. Alternatively, if a specific checkbox was needed to be identified, the following text syntax would identify the graphical element 301F: "square>:right text ("Use Default Search")". The text syntax ":right" is a shape descriptor that identifies where to locate the checkbox object 301F by locating the text "Use Default Search" to the right of the checkbox square.

The text syntax "rect>icon astrick:6" would be used to identify graphical object 301G (a password object). This text syntax looks for six asterisk objects within any rectangle object. The text syntax "rect>text(" ")" would be used to identify graphical object 301H (an empty text field). The text syntax "rect>text("Hello")" would be used to identify graphical object 301I.

Likewise, any of the rectangle objects can be identified using the index field (assuming that the index is based on top to bottom using right to left). For example, the text syntax rect[1] will identify the graphical object 301A, the text syntax rect[2] will identify the graphical object 301B, the text syntax rect[3] will identify graphical object 301C, the text syntax rect[4] will identify graphical object 301D, the text syntax rect[5] will identify graphical object 301G (not the checkbox 301F because it is a square object), and so on.

The radio button is a compound object that consists of four graphical objects 301J-301M. Graphical object 301J can be identified in different ways. For example, the text syntax "circle>icon ("Circle")" can be used to identify graphical object 301J (the currently selected radio button). The graphical object 301J can also be identified with the text syntax "circle~:right text("One")". To identify graphical object 301K (radio button two), the text syntax "circle:right text("Two")" is used. To identify graphical object 301L (radio button three), the text syntax "circle ~:right text ("Three")" is used. To identify graphical object 301M (radio button four), the text syntax "circle ~:right text("Four")" is used.

Graphical objects 301N-301Q comprise a compound list object. The compound list object comprise list objects 301N-301P and a scrollbar object 301Q. The graphical objects 301N-301Q can be identified in various ways. For example, the list item 301N can be identified using the text syntax "text("Item A1")", the list item 301O can be identified using the text syntax "text("Item A2")", and the list item 301P can be identified using the text syntax "text("Item AN")". The scrollbar object 301Q can be identify using the text syntax "verticalscrollbar ~:left text ("Item A2")". Alternatively, the scrollbar object 301Q can be identified using the text syntax "rect>icon ("Up Triangle" and "Down Triangle")". In this example, the scrollbar object 301D has two triangles, one that points up and one that points down.

The graphical object 301R (text area object 301R) can be identified in various ways, such as, "rect>text("TEXT AREA")", "rect>text("Multiline text 1")", "rect>text("text 2")", and/or the like. In these examples, information associated with the graphical object 301R is returned. However, a user may want to get a specific text location in the text area object 301R. For example, the user may want to insert text into the text area object 301R and needs a specific location to insert the text. The text syntax "rect>: end text("Multiline text 1")[color="grey"]" will identify the line position that is right after the end of the grey "Multiline text 1" text string in the text area object 301R. Likewise, the text syntax "rect>: start text("TEXT AREA")" identifies the starting position in the text area object 301R. Another alternative is "rect>text("TEXT AREA") [position=20]". In this example, the returned information includes a location in the text area object 301R just after the 20$^{th}$ character (assuming an index of 0 to indicate the beginning of the text area object 301R) in the text area object 301R. This process can also be used for any of the text field objects 301G-301I.

The graphical objects 301S-301T are two button objects that allows a user to scroll up and down in a window. The graphical objects 301S-301T may be identified in various ways. For example, the text syntax "circle>icon ("Arrow")" would identify both graphical objects 301S-301T. If the user wanted to identify a specific one of the graphical objects 301S-301T, additional information is needed, such as, "circle>icon ("Down Arrow")" to identify graphical object 301S and "circle>icon ("Up Arrow")" to identify graphical object 301T. Alternatively, the text syntax "circle~:above text("Down")" would identify the graphical object 301S.

The graphical objects 301U-301V are tab pane objects. In this example, the tab pane objects 301U-301V are machine learned objects. To identify the tab pane object 301U, the text syntax "tabpane>tab text("Tab 1")" can be used; to identify tab pane object 301V and text syntax "tabpane>tab text("Tab 2")" can be used. Since the text of tab pane 301U is visible, the text syntax "tabpane>text("Tab 1 Text") can be also used to identify tab pane object 301U.

The graphical objects 301W-301X are scrollbar objects. The scrollbar object 301W can be identified with the text syntax "verticalscrollbar: right". Likewise, the scrollbar object 301X can be identified with the text syntax "horizontalscrollbar: bottom". The returned information in this example, may also include the position of the slider and locations of the of the two scrollbar pointers.

The graphical objects 301Y-301Z are exemplary graphical objects 301 that are graphical objects 301 where machine learning 106 has not taken place and are unknown graphical objects 301. In some cases, a user may want to identify unknown graphical objects 301, such as, graphical objects 301Y-301Z. To do this, the text syntax "object+" is used. This text syntax returns information associated with any unknown graphical objects 301, which in this example are graphical objects 301Y-301Z. If the user wants to identify a specific one of the graphical objects 301Y-301Z, the text syntax "object+[0] will return information about graphical object 301Y and the text syntax "object+[1] will return information about graphical object 301Z.

Although not shown in FIG. 3, the system can identify if a graphical object 301 overlaps. For example, if there were two overlapping graphical objects (e.g., the button objects 301A and 301B overlapped), the text syntax "object &" would return the two overlapping graphical objects 301. The returned value may also include a location of the overlap. Alternatively, the returned value may be the top or bottom overlapping graphical object 301 depending on implementation. Likewise, the not overlap operator (!&) may also be used to identify any graphical objects 301 that don't overlap. For example, if the text syntax "object !& were used for the graphical user interface 300, all the graphical objects 301A-301Z would be returned.

The not around operator (!~) can be used to identify any graphical objects 301 that are not around a specific graphical object 301. The not around operator !~may include a range parameter that identifies a distance from the graphical object 301.

Each of the operators may have additional parameters and/or combinations that can identify relationships between the graphical objects 301 in the graphical user interface 300. For example, the text syntax "object>[color="yellow"]" may be used to identify all graphical objects that contain the color yellow. As one of skill in the art would recognize, all kinds of operators and parameters can be used to identify any kind of graphical object.

If a new graphical object is identified where machine learning can be used, the user can add a new graphical object type using the text syntax. Using the cloud button object 301Y as an example, the user can define a new text name (e.g., "cloudbutton") and then provide a series of examples of cloud buttons images to be associated with the new cloudbutton object (e.g., via a graphical user interface) as described in FIG. 2. For example, the user may select the cloud button object 301Y and then be asked provide the new text name (e.g., "cloudbutton") and to provide images for the machine learning 106.

Once trained, the machine learning 106 is then ready to now use the new text syntax. In one embodiment, the process could use unsupervised machine learning to dynamically (e.g. automatically) identify the cloud button object based on a history of machine learning. The system could dynamically prompt the user to provide the new cloud button text name and approve the addition of the new cloud button text syntax. At this point, the user can start writing new code for the test program 104. For example, the text syntax "cloudbutton >text("CB")" could now be used to identify the cloudbutton graphical object 301Y.

The returned information about a graphical object 301 can comprise various types of information associated with the graphical object 301. For example, the returned information may include a center location of the graphical object 301, coordinates of the graphical object 301, coordinates of fields of compound graphical objects 301, locations of scrollbar pointers (e.g., top pointer location, bottom pointer location, right pointer location, left pointer location, etc.), locations in a text area or field, and/or the like.

In addition, the return information can identify a plurality of graphical objects 301 in the graphical user interface 300 that match the text syntax. For example, the returned value may be an array of information, one for each identified graphical object 301. The returned information may include a message indicating that a plurality of graphical objects 301 are in the graphical user interface 300. If there are more than one graphical object 301 identified, the returned information may be a message indicating to refine the text syntax. Alternatively, if there are no identified graphical objects 301 a message indicating that no graphical objects 301 may be returned.

A user can then use the return information to programmatically perform actions. For example, the action may be to simulate a user action, such as, clicking on a graphical object 301, entering text in the graphical object 301, selecting a check box, selecting a radio button, selecting a menu selecting a menu item, moving a scrollbar, selecting a tab, doing a mouse hover, doing left mouse click, doing right mouse click, selecting a window, and/or the like.

To illustrate how a user can incorporate the text syntax into the test program 104, consider the following illustrative example where the text syntax is highlighted in bold along with line numbers to identify a specific line of code.

1   browser=ChromeEnvironment   (Browser Target( )).browser 2   browser.navigate ('http://www.bing.com')

3   ImageTarget (rect>text ("search").click( )

In line number 1, the code launches the Chrome browser. Line number 2 causes the browser to navigate to "http://www.bing.com". In line 3, the text syntax "red>text ("search")" identifies a rectangle graphical object 301 that contains the text "search" (i.e., a search button). The return information (e.g., a coordinates of a center location of the search button) is used to perform a click event on the search button. The above example is a test script for testing the application under test 121. One advantage to the text syntax is that the test script can be developed before and/or concurrently with the graphical user interface 300 based on a mockup model of the graphical user interface 300.

FIG. 4 is a flow diagram of a process for identifying graphical object(s) 301 in an image of a graphical user interface 300. The process starts in step 400. The image capture module 103 captures, in step 402, an image of a graphical user interface 300 (could be multiple images). The image of the graphical user interface 300 may be captured by intercepting a video image sent to a display or may be captured via a camera. The image of the graphical user interface 300 may be an image generated by a client/server application (application under test 121). Alternatively, the captured image of the graphical user interface 300 may come from a browser that is running a web page provided by the application under test 121. In another embodiment, the test system 101 may be on the test server/device 120.

The code execution module 105 determines, in step 404, if the text syntax has been reached in the test program 104. If the text syntax has not been reached in step 404, the process goes to step 414. Otherwise, if the text syntax has been reached in step 404, the code execution module 105 executes, in step 406, the text syntax in order to identify graphical objects 301 as described above in FIGS. 2-3.

The code execution module 105 determines, in step 408, if any graphical objects 301 have been identified based on the text syntax. If no graphical objects 301 were found that match the text syntax, in step 408, the code execution module 105 returns information to indicate that there were no graphical objects 301 that were found in step 410 and the process goes to step 414. Otherwise if one or more graphical objects 301 we found in step 408, the test program 104 returns, in step 412, information that identifies how to access the graphical object(s) 301 that are in the user interface 300.

The code execution module 105 determines, in step 414, if the test is complete. If the test is not complete in step 414, the process goes back to step 404. Otherwise, if the testing is complete in step 414, the process ends in step 416.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    capturing, by a hardware processor, an image of a graphical user interface;
    executing, by the hardware processor, a text syntax,
    wherein the text syntax is a form of an Application Programming Interface (API) and contains one or more parameters for identifying a graphical object and
    wherein the text syntax comprises at least one of: a type of object, a text value, a relational operator, a shape descriptor, and an index, and wherein the relational operator is one of an around operator, a contains operator, a does not contain operator, an overlap operator, a not overlap operator, a not around operator, and an unknown graphical object operator;
    based on the text syntax, identifying, by the hardware processor, the graphical object in the image of the graphical user interface; and
    returning, by the hardware processor, information that identifies how to access the graphical object in the graphical user interface,
    wherein the returned information comprises one of:
        information that identifies a plurality of graphical objects in the graphical user interface that match the text syntax;
        a message indicating that the plurality of graphical objects are in the graphical user interface; and
        a message indicating to refine the text syntax.

2. The method of claim 1, wherein the returned information further comprises one or more of a center location of the graphical object, coordinates of the graphical object, coordinates of fields of a compound graphical object, locations of one or more scrollbar pointers, and locations in a text area or field.

3. The method of claim 2, wherein a test script uses the center location and/or the coordinates of the graphical object to simulate at least one of: a user clicking on the graphical object, the user entering text in the graphical object, the user selecting a check box, the user selecting a radio button, the user selecting a menu, the user selecting a menu item, the user moving a scrollbar, the user selecting a tab, a mouse hover, a left mouse click, a right mouse click, and the user selecting a window.

4. The method of claim 1, wherein the returned information further comprises the information that identifies the plurality of graphical objects in the graphical user interface and wherein the returned information identifies a unique attribute for at least one of the plurality of graphical objects.

5. The method of claim 1, further comprising:
    using the returned information in a test script to test the graphical object in the graphical user interface.

6. The method of claim 1, wherein identifying the graphical object in the image of the graphical user interface is accomplished by training a machine learning algorithm with a plurality of different types of images that represent different versions of the graphical object.

7. The method of claim 1, wherein a new type of text syntax is added based on a machine learned history of graphical objects by dynamically prompting a user to provide a text name for the new type of text syntax.

8. A system, comprising:
    a hardware processor; and
    a computer readable medium, coupled with the hardware processor and comprising processor readable and executable instructions that, when executed by the hardware processor, cause the hardware processor to:
        capture an image of a graphical user interface;
        execute a text syntax,
        wherein the text syntax is a form of an Application Programming Interface (API) and contains one or more parameters for identifying a graphical object and
        wherein the text syntax comprises at least one of: a type of object, a text value, a relational operator, a shape descriptor, and an index, and wherein the relational operator is one of an around operator, a contains operator, a does not contain operator, an overlap operator, a not overlap operator, a not around operator, and an unknown graphical object operator;
        based on the text syntax, identify the graphical object in the image of the graphical user interface; and
        return information that identifies how to access the graphical object in the graphical user interface,
        wherein the return information comprises one of:
            information that identifies a plurality of graphical objects in the graphical user interface that match the text syntax;
            a message indicating that the plurality of graphical objects are in the graphical user interface; and
            a message indicating to refine the text syntax.

9. The system of claim 8, wherein the returned information further comprises one or more of a center location of the graphical object, coordinates of the graphical object, coordinates of fields of a compound graphical object, locations of one or more scrollbar pointers, and locations in a text area or field.

10. The system of claim 9, wherein a test script uses the center location and/or the coordinates of the graphical object to simulate at least one of: a user clicking on the graphical object, the user entering text in the graphical object, the user selecting a check box, the user selecting a radio button, the user selecting a menu, the user selecting a menu item, the user moving a scrollbar, the user selecting a tab, a mouse hover, a left mouse click, a right mouse click, and the user selecting a window.

11. The system of claim 8, wherein the return information further comprises the information that identifies the plurality of graphical objects in the graphical user interface and wherein the returned information identifies a unique attribute for at least one of the plurality of graphical objects.

12. The system of claim 8, wherein the hardware processor readable and executable instructions further cause the hardware processor to:
    use the return information in a test script to test the graphical object in the graphical user interface.

13. The system of claim 8, wherein identifying the graphical object in the image of the graphical user interface is accomplished by training a machine learning algorithm with a plurality of different types of images that represent different versions of the graphical object.

14. The system of claim 8, wherein a new type of text syntax is added based on a machine learned history of graphical objects by dynamically prompting a user to provide a text name for the new type of text syntax.

15. A non-transitory computer readable medium having stored thereon instructions that cause a hardware processor to execute a method, the method comprising instructions to:
capture an image of a graphical user interface;
execute a text syntax,
  wherein the text syntax is a form of an Application Programming Interface (API) and contains one or more parameters for identifying a graphical object and
wherein the text syntax comprises at least one of: a type of object, a text value, a relational operator, a shape descriptor, and an index, and wherein the relational operator is one of an around operator, a contains operator, a does not contain operator, an overlap operator, a not overlap operator, a not around operator, and an unknown graphical object operator;
based on the text syntax, identify the graphical object in the image of the graphical user interface; and
return information that identifies how to access the graphical object in the graphical user interface,
wherein the return information comprises one of:
  information that identifies a plurality of graphical objects in the graphical user interface that match the text syntax;
  a message indicating that the plurality of graphical objects are in the graphical user interface; and
  a message indicating to refine the text syntax.

16. The non-transitory computer readable medium of claim 15, wherein a new type of text syntax is added based on a machine learned history of graphical objects by dynamically prompting a user to provide a text name for the new type of text syntax.

17. The non-transitory computer readable medium of claim 15, wherein the returned information further comprises one or more of a center location of the graphical object, coordinates of the graphical object, coordinates of fields of a compound graphical object, locations of one or more scrollbar pointers, and locations in a text area or field.

18. The non-transitory computer readable medium of claim 17, wherein a test script uses the center location and/or the coordinates of the graphical object to simulate at least one of: a user clicking on the graphical object, the user entering text in the graphical object, the user selecting a check box, the user selecting a radio button, the user selecting a menu, the user selecting a menu item, the user moving a scrollbar, the user selecting a tab, a mouse hover, a left mouse click, a right mouse click, and the user selecting a window.

19. The non-transitory computer readable medium of claim 15, wherein the return information further comprises the information that identifies the plurality of graphical objects in the graphical user interface and wherein the return information identifies a unique attribute for at least one of the plurality of graphical objects.

20. The non-transitory computer readable medium of claim 15, wherein identifying the graphical object in the image of the graphical user interface is accomplished by training a machine learning algorithm with a plurality of different types of images that represent different versions of the graphical object.

* * * * *